United States Patent
Lin et al.

(10) Patent No.: US 10,057,868 B2
(45) Date of Patent: Aug. 21, 2018

(54) NARROWBAND ORTHOGONAL FREQUENCY-DIVISION MULTIPLE ACCESS CELL SEARCH

(71) Applicant: TELEFONAKTIEBOLAGET LM ERICSSON (PUBL), Stockholm (SE)

(72) Inventors: Xingqin Lin, San Jose, CA (US); Niklas Johansson, Uppsala (SE); Ansuman Adhikary, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 117 days.

(21) Appl. No.: 15/052,963

(22) Filed: Feb. 25, 2016

(65) Prior Publication Data
US 2016/0270015 A1  Sep. 15, 2016

Related U.S. Application Data

(60) Provisional application No. 62/130,023, filed on Mar. 9, 2015.

(51) Int. Cl.
*H04W 56/00* (2009.01)
*H04W 48/10* (2009.01)
*H04W 4/70* (2018.01)
*H04W 4/00* (2018.01)

(52) U.S. Cl.
CPC ....... *H04W 56/0015* (2013.01); *H04W 48/10* (2013.01); *H04W 56/0025* (2013.01); *H04W 4/005* (2013.01); *H04W 4/70* (2018.02)

(58) Field of Classification Search
CPC ......... H04W 56/0015; H04W 56/0025; H04W 48/10; H04W 4/005
See application file for complete search history.

(56) References Cited

U.S. PATENT DOCUMENTS

| | | | |
|---|---|---|---|
| 2010/0260154 A1* | 10/2010 | Frank | G01S 5/0205 370/336 |
| 2015/0036621 A1* | 2/2015 | Shin | H04J 11/0036 370/329 |
| 2015/0092768 A1* | 4/2015 | Ng | H04W 48/16 370/350 |
| 2015/0365931 A1* | 12/2015 | Ng | H04L 1/1812 370/329 |

(Continued)

FOREIGN PATENT DOCUMENTS

WO   2008083886 A1   7/2008

OTHER PUBLICATIONS

Qualcomm Inc. Narrow band OFDMA—Text proposal for TR. 3GPP TSG GERAN #65 Tdoc GP-150118. Shanghai, China. Mar. 9-13, 2015.

(Continued)

*Primary Examiner* — Min Jung

(57) ABSTRACT

In certain embodiments, a method in a network node comprises generating a synchronization signal using a set of sequences in a single part of a synchronization channel. The set of sequences is configured to allow one or more wireless devices to determine a cell identity and a slot identity during synchronization with the network node. The method also comprises transmitting the generated synchronization signal to the one or more wireless devices.

23 Claims, 12 Drawing Sheets

(56) References Cited

U.S. PATENT DOCUMENTS

| | | | |
|---|---|---|---|
| 2016/0135148 A1* | 5/2016 | Novlan | H04L 1/00 370/329 |
| 2016/0192396 A1* | 6/2016 | Ng | H04W 74/0808 370/329 |
| 2016/0227428 A1* | 8/2016 | Novlan | H04W 24/10 |
| 2017/0180086 A1* | 6/2017 | Xiong | H04L 1/1861 |

OTHER PUBLICATIONS

Qualcomm Inc. Narrow band OFDMA—Synchronization. 3GPP TSG GERAN #65 Tdoc GP-150113 Shanghai, China. Mar. 9-13, 2015.

Vodafone. New Study Item on Cellular System Support for Ultra Low Complexity and Low Throughput Internet of Things. 3GPP TSG-GERAN Meeting #62 GP-140421. Valencia, Spain, May 26-30, 2014.

Huawei et al. NB M2M—Frame Index Indication Design. 3GPP GERAN #64 GP-140861. San Francisco, USA Agenda Item: 7.1.5.3.5. Nov. 17-21, 2014.

Ericsson. On NB M2M Cell Search Mechanism. 3GPP TSG GERAN1 Adhoc#1 on FS_IoT_LC Tdoc GPC150068. Sophia Antipolis, France Agenda item 1.4.3.1. Feb. 2-5, 2015.

Huawei et al. NB M2M—Cell Search Mechanism. 3GPP GERAN #64 GP-140864. San Francisco, USA Agenda Item: 7.1.5.3.5. Nov. 17-21, 2014.

Huawei et al. NB M2M—Overview of the Physical Layer Design. 3GPP TSG GERAN #63 GP-140563. Ljubljana, Slovenia Agenda Item: 7.1.5.3.5. Aug. 25-Aug. 29, 2014.

Qualcomm. pCR to 45.820—Narrow band OFDMA—Synchronization. 3GPP Draft; GP-150212—PCR to TR 45.820—NB-OFDMA Synchronisation. 3rd Generation Partnership Project (3GPP). Mobile Competence Centre . • 650. Route Des Lucioles _• F-06921 Sophia-Antipolis Cedex • France vol. TSG GERAN. no. Shanghai. China; Mar. 9, 2015-Mar. 13, 2015. Mar. 8, 2015 (Mar. 8, 2015).

Ericsson. 0n NB M2M Cell Search Mechanism 1 Introduction 2 Background. 3GPP Draft; GP-150143. On NB M2M Cell Search Mechanism. 3rd Generation Partnership Project (3GPP). Mobile Competence Centre ; 650. Route Des Lucioles ; F-06921 Sophia-Antipolis Cedex France vol. TSG GERAN. no. Shanghai. P.R. China; Mar. 9, 2015-Mar. 13, 2015. Mar. 8, 2015 (Mar. 8, 2015).

Huawel Proposed Text for the TR on Physical Broadcast Channels for NB M2M. 3GPP Draft; GPC150031—Proposed Text for the TR on Physical Broadcast Channels for NB M2M V4. 3rd Generation Partnership Project (3GPP). Mobile Competence Centre; 650. Route Des Lucioles ; F-06921 vol. GERAN WG1. no. Sophia-Antipolis. France; Feb. 2, 2015-Feb. 5, 2015. Feb. 2, 2015 (Feb. 2, 2015).

* cited by examiner

NARROWBAND ORTHOGONAL FREQUENCY-DIVISION MULTIPLE ACCESS CELL SEARCH

PRIORITY

This application claims the benefit under 35 U.S.C. § 119(e) of the priority of U.S. Provisional Application 62/130,023 filed on Mar. 9, 2015, entitled "NB OFDMA Cell Search," the entire disclosure of which is hereby incorporated by reference.

TECHNICAL FIELD

The present disclosure relates, in general, to wireless communications and, more particularly, to narrowband OFDMA cell search.

BACKGROUND

The Internet of Things (IoT) is a vision for the future world where everything that can benefit from a connection will be connected. Cellular technologies are being developed or evolved to play an indispensable role in the IoT world, particularly the machine type communication (MTC). MTC tends to place lower demands on the network with respect to data rates, for example, as compared to mobile broadband. In general, MTC may be characterized as requiring low cost device design, better coverage, and the ability to operate for years on batteries without charging or replacing the batteries. To meet the IoT design objectives, 3GPP is currently studying the evolutions of existing 2G/3G/4G LTE technologies, including the study item "Cellular System Support for Ultra Low Complexity and Low Throughput Internet of Things" approved in GERAN#62. The current studies under GERAN include both GSM evolution and completely new designs. There are two main so-called "Clean Slate" approaches: (i) Narrowband FDMA, and (ii) Narrowband OFDMA. These Clean Slate approaches are narrowband (NB) systems with a carrier bandwidth of 200 kHz and target improved coverage compared to today's GSM systems, long battery life, and low complexity communication design. One intention with these approaches is to deploy it in spectrum that is currently used for GSM, by reducing the bandwidth used by GSM and deploying NB Clean Slate systems in the spectrum that becomes available. Another intention is to reuse existing GSM sites for the deployment of NB Clean Slate systems.

Cell search is an essential step for the proper operation of devices within a network. Successful cell search is needed for devices to receive and decode system information required for proper communication within a cell. During the cell search, devices acquire synchronization information including both symbol and frequency synchronizations of a cell. In addition, in the presence of multiple cells, the mobile station also needs to distinguish the particular cell on the basis of a cell ID, and obtain the corresponding frame number to perform frame synchronization. Thus, a typical cell search procedure consists of determining the timing alignment, correcting the frequency offset and obtaining both the correct cell ID as well as the frame ID.

When the device wakes up from deep sleep, for example from being in a power saving state, the frequency offset is to a large extent due to device clock inaccuracy, often assumed to be up to 20 ppm. The clock inaccuracy results in a drift in the timing of the sampling of the received signal. To the device receiver, this drift appears mainly as a frequency offset of the received signal, a continuous rotation of the received samples. For a system operating with 20 ppm with a carrier frequency of 900 MHz, the maximum frequency offset is 18 kHz. This offset needs to be estimated and corrected for.

Existing cell search approaches for Clean Slate systems are described as follows.

(I) Cell Search in NB FDMA—Option A

Cell search is assumed to be performed using three sequences:

(a) Primary Synchronization Sequence (PSS): The PSS is used to determine the frame timing alignment, along with a coarse estimation of the frequency offset.

(b) Secondary Synchronization Sequence (SSS): The SSS is used to obtain a finer estimate of the frequency offset. Together with the PSS, the SSS also determines the cell ID.

(c) Frame Index Indication Signal (FIIS): The FIIS is used to determine the frame number, i.e., the ID of the current frame in the superframe. Each superframe consists of 64 consecutive frames.

Every frame consists of 960 symbols. 256 symbols are dedicated to PSS, 257 for SSS, 127 for FIIS and the remaining 320 symbols are for carrying the broadcast information in a Broadcast Information Block (BIB).

An MTC device first needs to search for a signal in a viable frequency band after switching on. Signal detection is performed on the basis of comparing the amplitude of the peak from a correlation based detector with a pre-determined threshold. This is achieved by correlating the received signal with a known sequence, or a set of known sequences.

The combination of PSS and SSS is also used to determine the ID of the particular cell, after the MTC device has performed the timing and frequency synchronization. In order to achieve this functionality, three pre-defined sequences are used for PSS, and 12 are used for SSS, giving a total of 36 possible combinations. Each combination is used by a particular cell, and this in turn, enables the MTC device to determine the cell ID. Specifically, the MTC device first tests each of the three PSS to determine the one with the highest correlator output. This gives the frame timing, and then, the device tests each of the 12 SSS to determine the one with the highest output at the correlator to correct the frequency offset. Once the two sequences have been found, they correspond to one of the 36 possible combinations, which determine the cell ID. The next sequence, FIIS, is then used to obtain the frame number and this completed the cell synchronization procedure.

(II) Cell Search in NB FDMA—Option B

In this design for the cell synchronization procedure, three sequences are used. They are given as follows:

(a) Synchronization Sequence (SS): A single sequence is used for both the frame timing estimation and frequency offset correction.

(b) Cell ID Sequence (CIS): A separate sequence is used to determine the cell ID.

(c) Frame Index Indication Sequence (FIIS): A third sequence is reserved to determine the frame number.

The SS sequence is composed of 410 symbols, the CIS has 101 symbols, and the FIIS has 127 symbols. The remaining 322 symbols are used for carrying the broadcast information, making the total number of symbols in the frame equal to 960.

The cell search procedures are as follows. First, the symbol synchronization is achieved by a correlation-based search for SS. The SS is further used for frequency offset correction. After acquiring symbol and frequency synchronizations using the SS, the transmitted CIS sequence is detected by searching over the 100 CIS candidates. The detected CIS provides information on the cell ID. Lastly, the FIIS is then used to obtain the frame number and this completed the cell synchronization procedure.

(III) Cell Search in NB OFDMA

A downlink frame consists of 163 normal slots and 8 special slots. A normal slot consists of 14 OFDM symbols, each having 72 subcarriers. The OFDM sampling rate is 320 kHz with a FFT length 128. The 8 special slots are used for physical synchronization channels (PSCH), the transmission of which is of single carrier rather than OFDM. The symbol rate in a special slot is 160 kHz, allowing a rolloff factor 0.25 in raised cosine filter to be used in the 200 kHz channel. To match the 320 kHz OFDM sampling rate, the symbols in the special slots are 2× up sampled. The PSCH consists of two parts: PSS and SSS. The functions of PSS and SSS are as follows.

(a) PSS: A single sequence for initial symbol-level synchronization and carrier frequency offset (CFO) estimation.

(b) SSS: A SSS consists of two sequences, SSS-1 and SSS-2, conveying both the index of the associated special slot within a frame and cell-specific ID information. Further, SSS can be used to refine CFO estimation and to detect false alarm.

The PSS consists of 416 symbols and is based on a length-255 Kasami sequence. The SSS consists of 284 symbols and is generated based on length-71 Zadoff-Chu (ZC) sequences. In particular, both SSS-1 and SSS-2 are based on a length-71 ZC sequences.

The cell search procedures go as follows. First, the symbol synchronization is achieved by a correlation-based search for PSS. After acquiring symbol synchronization, the CFO is estimated using the PSS symbols. After acquiring symbol and frequency synchronizations using the PSS, the transmitted SSS sequence is detected by searching over the 70×70 SSS candidates. The detected SSS provides information on the slot index and cell-specific identity. SSS may be further used to refine the CFO estimation and to detect false alarm. Specifically, if the maximum SSS correlation energy does not exceed some predetermined threshold, the current cell search results are considered to be false and the cell search needs to be continued. Once the slot index is decoded, the device can sleep until the broadcast channel, which carries system information and is located at the beginning of each downlink frame, arrives.

The two designs of cell search proposed for NB FDMA are not applicable to NB OFDMA. As for the design of cell search in the NB OFDMA, it has several issues that are described in detail as follows.

With the new MTC systems and the MTC improvements of current systems the coverage is extended. That means that many devices will operate in bad or extended coverage with much lower received signal strength levels than before. To perform the procedures associated with cell search, in particular, to estimate the time offset, the frequency offset, the cell ID, and the frame/slot ID, becomes more difficult with weak signals. This necessitates the device to accumulate multiple frames, or multiple repetitions, of sync signals to gather enough energy over time to achieve good enough detection and estimation accuracy. Accumulating multiple frames means extending the time required for synchronization and cell search, which means that the device must be active for a longer period of time, which introduces a delay and reduces the battery life.

In the design for NB OFDMA, the 8 PSCHs in a downlink frame appears non-uniformly, making it more complex to accumulate multiple PSCHs, since the offset in time between two special slots depends on the unknown slot number. In particular, 8 hypotheses are needed for accumulating 8 PSSs. Further, this irregular structure is of no particular use in the system design.

Another issue is that the cross-correlation of the SSS sequences may be poor as two combinations may have an identical portion in either SSS-1 or SSS-2. In this case, the cross-correlation of two SSS sequences equals $1+1/\sqrt{71}$, which is only about 3 dB lower than the peak cross-correlation value 2. This makes the SSS detection accuracy vulnerable to noise, which is an undesirable property for devices operating in bad or extended coverage. To get more accurate SSS detection, accumulating multiple SSSs may be required, which introduces a delay and reduces the battery life.

SUMMARY

To address the foregoing problems with existing approaches, disclosed is a method in a network node. The method comprises generating (400) a synchronization signal using a set of sequences in a single part of a synchronization channel. The set of sequences is configured to allow one or more wireless devices (110) to determine a cell identity and a slot identity during synchronization with the network node. The method also comprises transmitting (410) the generated synchronization signal to the one or more wireless devices.

In certain embodiments, the set of sequences comprises a root and a shift configured to allow the one or more wireless devices to determine the cell identity and the slot identity. As an example, the root of a Zadoff-Chu sequence is configured to allow the one or more wireless devices to determine the cell identity, and the shift is configured to allow the one or more wireless devices to determine the slot identity. Alternatively, as another example, the root of a Zadoff-Chu sequence is configured to allow the one or more wireless devices to determine the slot identity, and the shift is configured to allow the one or more wireless devices to determine the cell identity.

In certain embodiments, the set of sequences comprises a primary synchronization signal (PSS) sequence and a secondary synchronization signal (SSS) sequence. The PSS sequence is configured to allow the one or more wireless devices to determine a time offset estimation for locating the SSS sequence and a frequency offset estimation for frequency correcting the SSS sequence. The SSS sequence is configured to allow the one or more wireless devices to determine the cell identity and the slot identity. Optionally, in certain embodiments, the SSS sequence allows the one or more wireless devices to refine the time offset estimation, to refine the frequency offset estimation determined from the PSS sequence, and/or allow the one or more wireless devices to determine whether a false detection has occurred based on whether a highest correlation peak obtained from the SSS sequence exceeds a threshold for successful cell detection. In certain embodiments, the PSS sequence comprises a differentially encoded Zadoff-Chu sequence and the SSS sequence comprises a cyclically shifted Zadoff-Chu sequence.

In certain embodiments, the PSS is periodically transmitted from the network node according to a uniform periodicity. In certain embodiments, the PSS may have a relatively short periodicity, which may allow the wireless devices to detect the cell ID and slot ID more quickly which may in turn conserve battery life. As an example, a PSS period of 10 ms may be used. For standalone deployment (i.e., the system is not deployed within LTE carrier that limits the transmit power), the period can be relaxed to 125 ms. Any other suitable period can be used depending on the deployment scenario.

Also disclosed is a method in a wireless device (110). The method comprises receiving (700) a synchronization signal from a network node (115). The received synchronization signal comprises a set of sequences in a single part of a synchronization channel. The method also comprises determining (710) a cell identity of a cell associated with the network node using the set of sequences is the single part of the synchronization channel. The method further comprises determining (720) a slot identity using the set of sequences in the single part of the synchronization channel.

In certain embodiments, the set of sequences comprises a root and a shift configured to allow the wireless device to determine the cell identity and the slot identity. As an example, the root of a Zadoff-Chu sequence is configured to allow the wireless device to determine the cell identity, and the shift is configured to allow the wireless device to determine the slot identity. Alternatively, as another example, the root of a Zadoff-Chu sequence is configured to allow the wireless device to determine the slot identity, and the shift is configured to allow the wireless device to determine the cell identity.

In certain embodiments, the set of sequences comprises a primary synchronization signal (PSS) sequence and a secondary synchronization signal (SSS) sequence. The PSS sequence is configured to allow the wireless device to determine a time offset estimation for locating the SSS sequence and a frequency offset estimation for frequency correcting the SSS sequence. The SSS sequence is configured to allow the wireless device to determine the cell identity and the slot identity. Optionally, in certain embodiments, the method further comprises using the SSS sequence to refine the time offset estimation from the PSS sequence, to refine the frequency offset estimation determined from the PSS sequence, and/or to determine whether a false detection has occurred based on whether a highest correlation peak obtained from the SSS sequence exceeds a threshold for successful cell detection. In certain embodiments, the PSS sequence comprises a differentially encoded Zadoff-Chu sequence and the SSS sequence comprises a cyclically shifted Zadoff-Chu sequence.

In certain embodiments, the PSS is periodically transmitted from the network node according to a uniform periodicity. In certain embodiments, the PSS may have a relatively short periodicity, which may allow the wireless devices to detect the cell ID and slot ID more quickly which may in turn conserve battery life. As an example, a PSS period of 10 ms may be used. For standalone deployment (i.e., the system is not deployed within LTE carrier that limits the transmit power), the period can be relaxed to 125 ms. Any other suitable period can be used depending on the deployment scenario.

Also disclosed is a network node (115), comprising one or more processors configured to generate (400) a synchronization signal using a set of sequences in a single part of a synchronization channel. The set of sequences is configured to allow one or more wireless devices (110) to determine a cell identity and a slot identity during synchronization with the network node. The one or more processors are also configured to transmit (410) the generated synchronization signal to the one or more wireless devices.

In certain embodiments, the set of sequences comprises a root and a shift configured to allow the one or more wireless devices to determine the cell identity and the slot identity. As an example, the root of a Zadoff-Chu sequence is configured to allow the one or more wireless devices to determine the cell identity, and the shift is configured to allow the one or more wireless devices to determine the slot identity. Alternatively, as another example, the root of a Zadoff-Chu sequence is configured to allow the one or more wireless devices to determine the slot identity, and the shift is configured to allow the one or more wireless devices to determine the cell identity.

In certain embodiments, the set of sequences comprises a primary synchronization signal (PSS) sequence and a secondary synchronization signal (SSS) sequence. The PSS sequence is configured to allow the one or more wireless devices to determine a time offset estimation for locating the SSS sequence and a frequency offset estimation for frequency correcting the SSS sequence. The SSS sequence is configured to allow the one or more wireless devices to determine the cell identity and the slot identity. Optionally, in certain embodiments, the SSS sequence allows the one or more wireless devices to refine the time offset estimation, to refine the frequency offset estimation determined from the PSS sequence, and/or allow the one or more wireless devices to determine whether a false detection has occurred based on whether a highest correlation peak obtained from the SSS sequence exceeds a threshold for successful cell detection. In certain embodiments, the PSS sequence comprises a differentially encoded Zadoff-Chu sequence and the SSS sequence comprises a cyclically shifted Zadoff-Chu sequence.

In certain embodiments, the PSS is periodically transmitted from the network node according to a uniform periodicity. In certain embodiments, the PSS may have a relatively short periodicity, which may allow the wireless devices to detect the cell ID and slot ID more quickly which may in turn conserve battery life. As an example, a PSS period of 10 ms may be used. For standalone deployment (i.e., the system is not deployed within LTE carrier that limits the transmit power), the period can be relaxed to 125 ms. Any other suitable period can be used depending on the deployment scenario.

Also disclosed is a wireless device (110), comprising one or more processors configured to receive (700) a synchronization signal from a network node (115). The received synchronization signal comprises a set of sequences in a single part of a synchronization channel. The one or more processors are further configured to determine (710) a cell identity of a cell associated with the network node using the set of sequences is the single part of the synchronization channel, and to determine (720) a slot identity using the set of sequences in the single part of the synchronization channel.

In certain embodiments, the set of sequences comprises a root and a shift configured to allow the wireless device to determine the cell identity and the slot identity. As an example, the root of a Zadoff-Chu sequence is configured to allow the wireless device to determine the cell identity, and the shift is configured to allow the wireless device to determine the slot identity. Alternatively, as another example, the root of a Zadoff-Chu sequence is configured to allow the wireless device to determine the slot identity, and the shift is configured to allow the wireless device to determine the cell identity.

In certain embodiments, the set of sequences comprises a primary synchronization signal (PSS) sequence and a secondary synchronization signal (SSS) sequence. The PSS sequence is configured to allow the wireless device to determine a time offset estimation for locating the SSS sequence and a frequency offset estimation for frequency correcting the SSS sequence. The SSS sequence is configured to allow the wireless device to determine the cell identity and the slot identity. Optionally, in certain embodiments, the wireless device is further configured to use the SSS sequence to refine the time offset estimation from the PSS sequence, to refine the frequency offset estimation determined from the PSS sequence, and/or to determine whether a false detection has occurred based on whether a highest correlation peak obtained from the SSS sequence exceeds a threshold for successful cell detection. In certain embodiments, the PSS sequence comprises a differentially encoded Zadoff-Chu sequence and the SSS sequence comprises a cyclically shifted Zadoff-Chu sequence.

In certain embodiments, the PSS is periodically transmitted from the network node according to a uniform periodicity. In certain embodiments, the PSS may have a relatively short periodicity, which may allow the wireless devices to detect the cell ID and slot ID more quickly which may in turn conserve battery life. As an example, a PSS period of 10 ms may be used. For standalone deployment (i.e., the system is not deployed within LTE carrier that limits the transmit power), the period can be relaxed to 125 ms. Any other suitable period can be used depending on the deployment scenario.

Certain embodiments of the present disclosure may provide one or more technical advantages. For example, in certain embodiments, a single signal, the primary synchronization signal (PSS), a differentially encoded Zadoff-Chu sequence (or m-sequence, Gold sequence, or other sequence with good autocorrelation properties), is transmitted from the base station in each cell, and is used by the device (terminal, user equipment) to obtain both time offset estimation, and frequency offset estimation.

By using a differentially encoded sequence, the time offset estimation is robust to large frequency errors. Thus, good time offset estimation accuracy can be achieved, independent of frequency error.

When the time offset has been determined, the same PSS signal is reused for frequency offset estimation. Since the PSS signal is a known signal with constant amplitude, the sequence is easily reused for frequency offset estimation.

In bad or extended coverage the above time estimation uses accumulation of multiple slots to achieve sufficient accuracy. A new frame structure in which PSCHs appear uniformly in downlink frames is designed, reducing the complexity of accumulating multiple PSCHs at the devices.

Furthermore, in certain embodiments, the solution can include using the time and frequency offset estimates described above to locate a SSS signal time, to frequency correct it, and to detect the cell ID and slot ID. The SSS signal containing cell ID and slot ID is transmitted by the base station in each cell in each special slot. The SSS is based on Zadoff-Chu sequences, whose roots determine the cell ID and cyclic shifts determine the slot ID.

In certain embodiments, the solution proposed in this disclosure provides faster synchronization than the previous approaches for NB OFDMA, by using a uniform downlink frame structure with longer and denser PSCHs, which in turn reduces the accumulation complexity. Faster synchronization means shorter active time for the device, which increases the battery life.

Furthermore, for certain embodiments of the SSS design, a single sequence conveying both the index of the associated special slot within a frame and cell-specific ID information is used. The sequence is based on length-149 Zadoff-Chu sequences, whose roots determine the cell ID and cyclic shifts determine the slot ID. The cross-correlation of two SSS sequences equals $1/\sqrt{149}$, which is about 11 dB lower than the peak cross-correlation value 1. This makes the SSS detection robust with respect to noise. In other words, to achieve certain SSS detection accuracy, devices operating in bad or extended coverage are required to accumulate less SSSs, which shortens the delay and prolongs the battery life. The idea of applying different cyclic shifts to the Zadoff-Chu sequences in the SSS design leads to better system performance and more flexible design.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
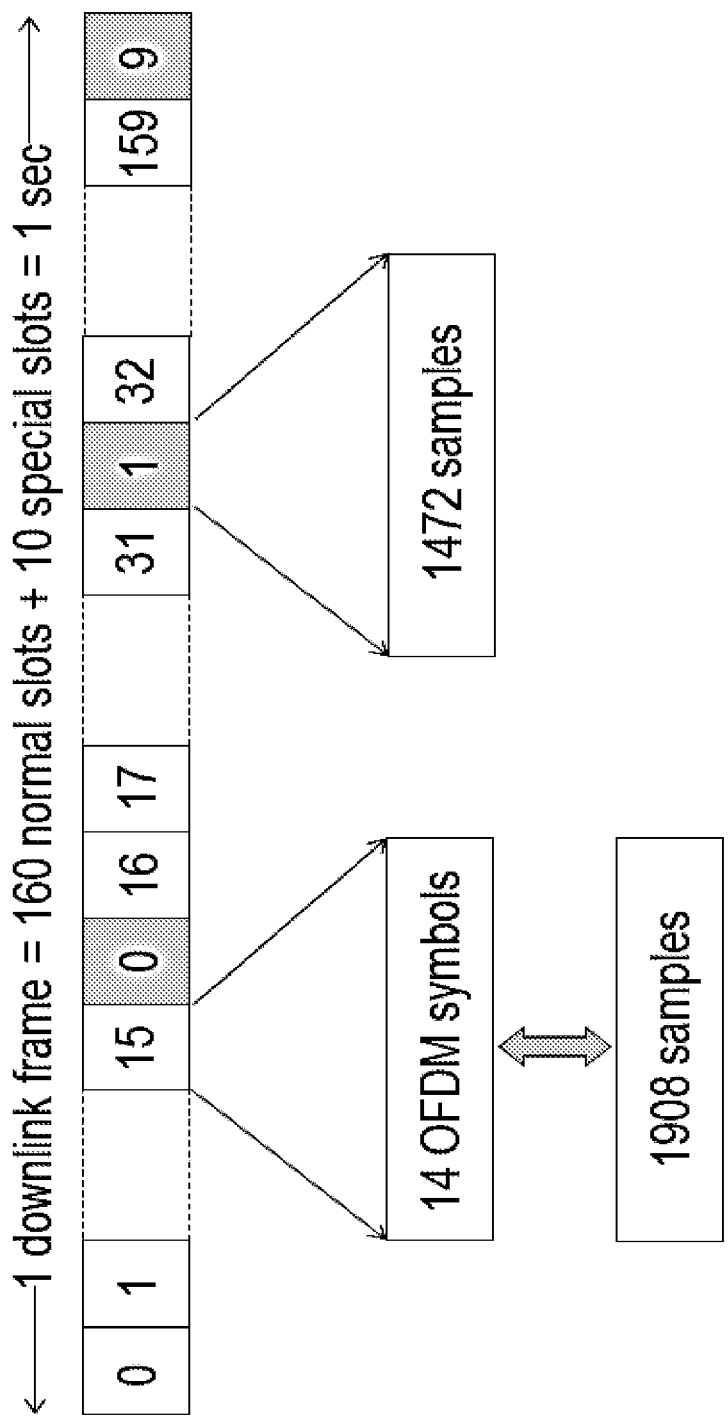
FIG. 1 illustrates a frame structure for a downlink frame, in accordance with certain embodiments.

Wireless devices perform a cell search in order to be able to receive and decode system information required for proper communication within a cell. Certain embodiments of the present disclosure relate to synchronization signals that a network node transmits to help wireless devices perform a cell search. As further discussed below, the synchronization signals may be transmitted in a physical synchronization channel (PSCH) slot of a downlink frame of a narrowband orthogonal frequency-division multiple access (NB OFDMA) network. FIG. 1 illustrates an example of a downlink frame structure design for NB OFDMA, and FIG. 2 illustrates an example frame structure for a PSCH, in accordance with certain embodiments.

In FIG. 1, an embodiment of a downlink frame structure consists of 160 normal slots and 10 special slots, and the physical channel bandwidth is 200 kHz. A normal slot consists of 14 OFDM symbols, each having 72 subcarriers. The OFDM sampling rate is 320 kHz with a FFT length 128. The 10 special slots are used for physical synchronization channels, the transmission of which is of single carrier. The symbol rate in a special slot is 160 kHz, allowing a rolloff factor 0.20 in raised cosine filter to be used in the 200 kHz channel. To match the 320 kHz OFDM sampling rate, the symbols in the special slots are 2× up sampled. A PSCH occupies one special slot.

Figure 2:
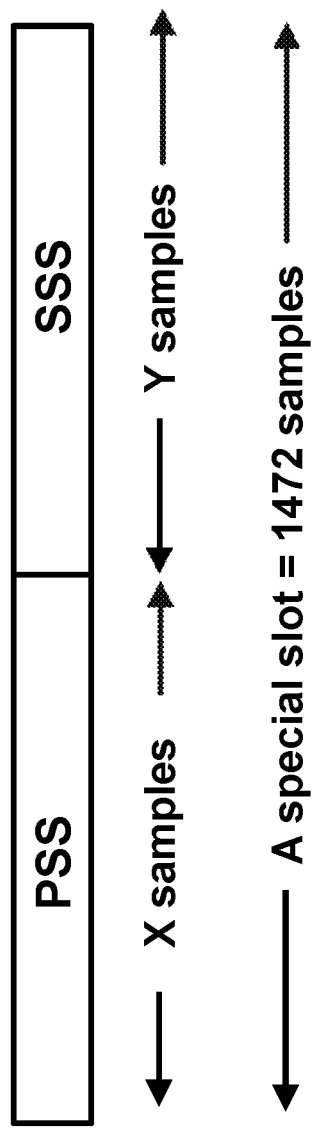
FIG. 2 illustrates a frame structure for a Physical Synchronization Channel (PSCH), in accordance with certain embodiments.

In FIG. 2, an embodiment of a PSCH consists of two parts, a primary synchronization signal (PSS) and a secondary synchronization signal (SSS). A wireless device, such as an MTC device, first obtains the frame timing using the PSS sequence and then uses the same for determining the frequency offset. After the frame timing is found and frequency offset corrected, the SSS is used to determine the cell ID and slot ID.

Figure 3:
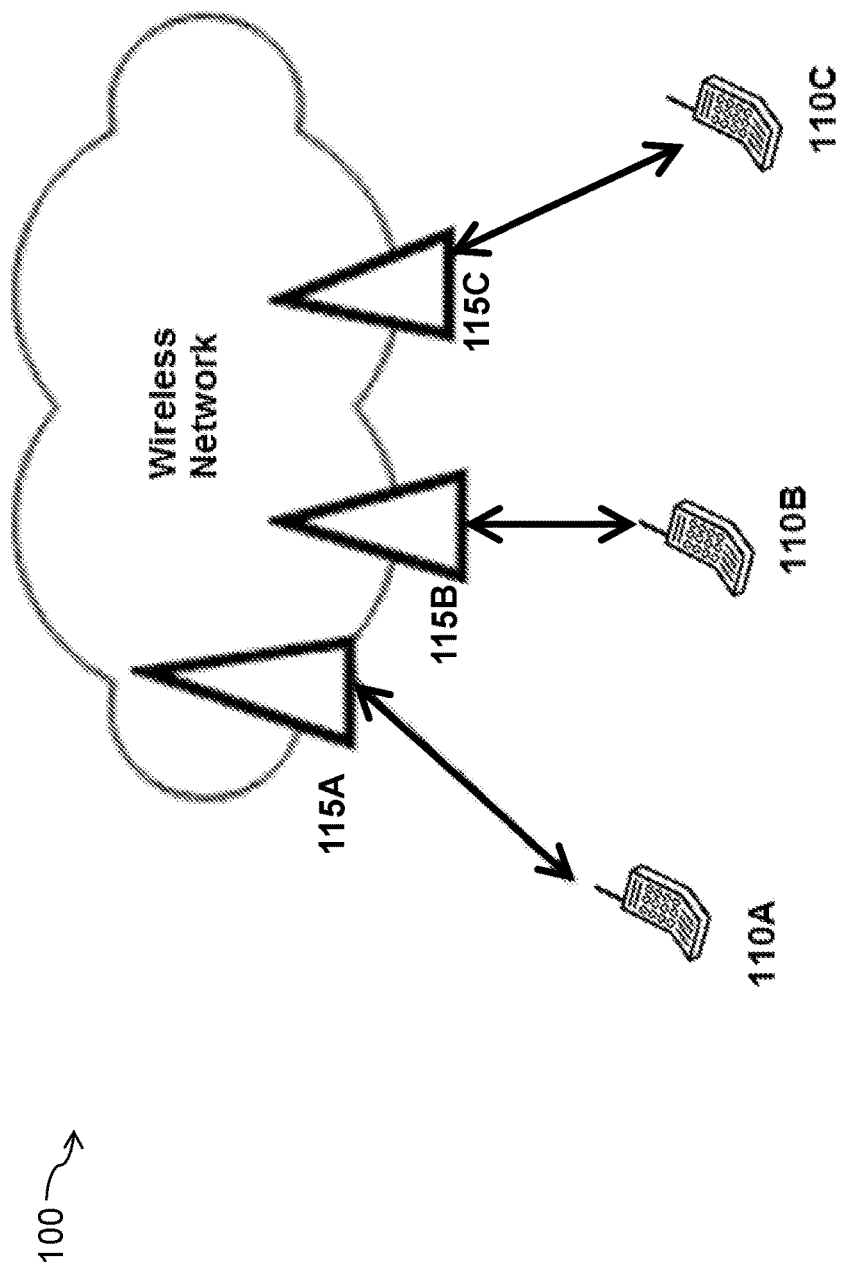
FIG. 3 is a block diagram of a network, in accordance with certain embodiments.

FIG. 3 is a block diagram of a network 100, in accordance with certain embodiments. Network 100 may include one or more wireless devices 110 and one or more different types of network nodes 115 capable of communicating (directly or indirectly) with wireless devices 110. In some embodiments, network node 115 generates and transmits a synchronization signal configured to allow wireless device 110 to determine a cell identity and a slot identity during synchronization with network node 115, and wireless device 110 receives the synchronization signal and determines the cell identity and slot identity.

Wireless devices 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. Example embodiments of wireless device 110 (which may be interchangeably referred to as user equipment (UE) 110, MTC UE 110, MTC device 110, etc.) are described in more detail below with respect to FIGS. 9 and 11. Example embodiments of network node 115 (which may be interchangeably referred to as an eNodeB (eNB) 115, a base station, etc.) are described in more detail below with respect to FIGS. 10 and 12. In some embodiments, an area of wireless signal coverage associated with a network node 115 may be referred to as a cell.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data).

Figure 4:
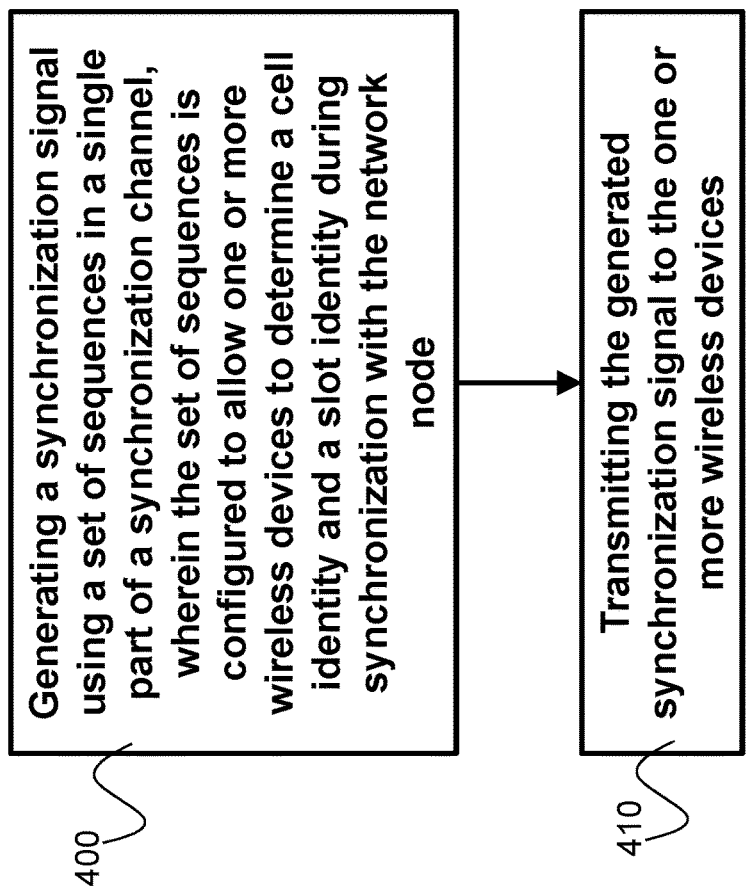
FIG. 4 is a flow diagram of a method in a network node for generating a synchronization signal, in accordance with certain embodiments.

FIG. 4 is a flow diagram of a method in a network node 115 for generating a synchronization signal, in accordance with certain embodiments. In general, at step 400 the method generates a synchronization signal and at step 410 the method transmits the generated synchronization signal to one or more wireless devices 110 via a synchronization channel. The synchronization channel may comprise multiple parts. As an example, the synchronization channel may have two parts: PSS and SSS. Step 400 generates the synchronization signal using a set of sequences in a single part of the synchronization channel, wherein the set of sequences is configured to allow one or more wireless devices to determine a cell identity and a slot identity during synchronization with the network node. Thus, in certain embodiments, the set of sequences are conveyed in a single part of the synchronization channel (such as the SSS) without relying on the relationship with other parts of the synchronization channel (such as the PSS).

Any suitable type of sequence may be used, such as a Zadoff-Chu sequence, m-sequence, Gold sequence, or other sequence with good autocorrelation properties. As an example, a cyclically shifted Zadoff-Chu sequence may comprise a root configured to allow wireless devices 110 to determine the cell identity and a shift configured to allow wireless devices 110 to determine slot identity, or vice versa. Slot identity should be considered a generic term. It may be called frame ID, subframe ID, etc. in different contexts. Further examples of step 400 are further discussed below with respect to FIG. 5 (e.g., steps 510-550) and FIG. 6 (e.g., steps 600-670).

Figure 5:
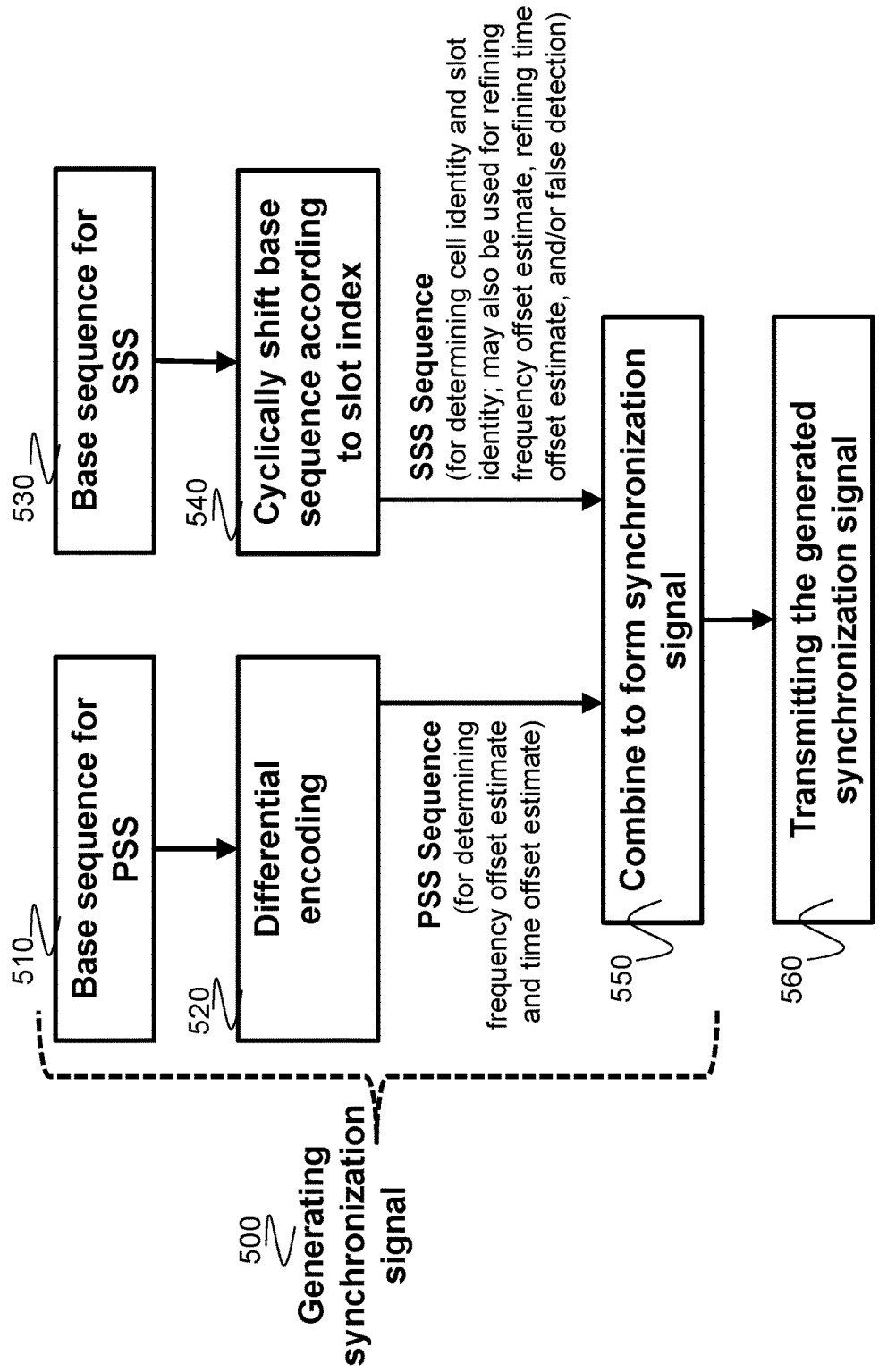
FIG. 5 is a flow diagram of a method in a network node for generating a synchronization signal, in accordance with certain embodiments.

FIG. 5 is a flow diagram of a method in a network node for generating a synchronization signal, in accordance with certain embodiments. Method 500 (e.g., steps 510-550) generates a synchronization signal using a set of sequences in a single part of a synchronization channel. The set of sequences is configured to allow one or more wireless devices 110 to determine a cell identity and a slot identity during synchronization with the network node 115. In certain embodiments, the set of sequences comprises a primary synchronization signal (PSS) sequence and a secondary synchronization signal (SSS) sequence. The PSS sequence is configured to allow the one or more wireless devices 110 to determine a time offset estimation for locating the SSS sequence and a frequency offset estimation for frequency correcting the SSS sequence. The SSS sequence is configured to allow the one or more wireless devices 110 to determine the cell identity and the slot identity.

At step 510, the method determines a base sequence for the PSS. The base sequence for the PSS may be a Zadoff-Chu sequence, m-sequence, Gold sequence, or other sequence with good autocorrelation properties. At step 520, the method differentially encodes the base sequence for the PSS to yield the PSS sequence (the sequence configured to allow wireless devices 110 to determine the time offset estimate and the frequency offset estimate). As an example, in certain embodiments, the PSS sequence comprises a differentially encoded Zadoff-Chu sequence.

At step 530, the method determines a base sequence for the SSS. The base sequence for the SSS may be a Zadoff-Chu sequence, m-sequence, Gold sequence, or other sequence with good autocorrelation properties. At step 530, the method cyclically shifts the base sequence for the SSS according to a slot index to yield the SSS sequence (the sequence configured to allow wireless devices 110 to determine the cell identity and slot identity). As an example, in certain embodiments, the SSS sequence comprises a cyclically shifted Zadoff-Chu sequence having a root and a shift. The root is configured to allow the one or more wireless devices to determine the cell identity, and the shift is configured to allow the one or more wireless devices to determine the slot identity. However, in certain alternative embodiments, the root can be configured to allow the one or more wireless devices to determine the slot identity, and the shift is configured to allow the one or more wireless devices to determine the cell identity.

The PSS sequence and/or the SSS sequence may also be configured for any other suitable purpose. As an example, in certain embodiments, the SSS sequence allows the one or more wireless devices 110 to refine the time offset estimation and/or the frequency offset estimation determined from the PSS sequence. In addition, or in the alternative, in certain embodiments, the SSS sequence allows the one or more wireless devices 110 to determine whether a false detection has occurred based on whether a highest correlation peak obtained from the SSS sequence exceeds a threshold for successful cell detection.

At step 550, the PSS sequence and the SSS sequence are combined to form the synchronization signal. At step 560, the method transmits the generated synchronization signal to the one or more wireless devices 110. In certain embodiments, the PSS and SSS are transmitted according to a uniform periodicity.

Figure 6:
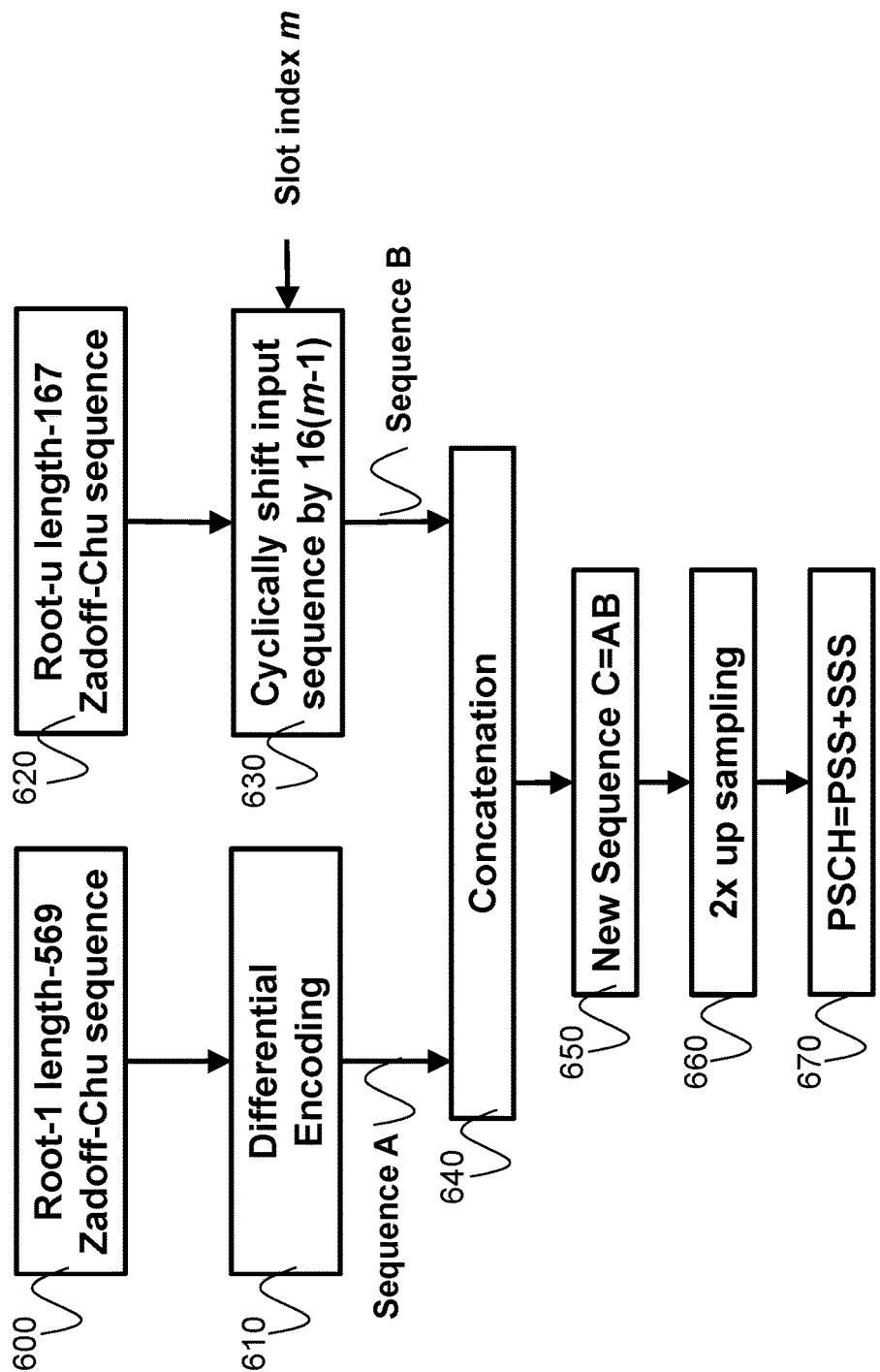
FIG. 6 is a flow diagram of a method in a network node for generating a synchronization signal, in accordance with certain embodiments.

FIG. 6 is a flow diagram of a method in a network node 115 for generating a synchronization signal, in accordance with certain embodiments. In certain embodiments, both PSS and SSS are generated based on ZC sequences, which give rise to constant amplitude synchronization signals. But it should be noted that in alternative embodiments other sequences than Zadoff-Chu can be used for PSS and for SSS. For example m-sequences, Gold sequences, or other sequences with good correlation properties. Good correlation properties are low autocorrelation at non-zero correlation lag, and high autocorrelation at zero lag, and low cross correlation between different sequences used for the same purpose (e.g. different SSS corresponding to different cells).

At step 600, the method determines a base sequence for the PSS. The PSS has X/2 symbols, while the SSS has Y/2 symbols. Note that the cross correlation between two prime length ZC sequences with root indices $u_1$ and $u_2$ respectively is constant $1/\sqrt{(N_{zc})}$, provided that $u_1$-$u_2$ is relative prime to $N_{zc}$. Therefore, it is good to use ZC sequences of prime length. In certain embodiments, X/2+Y/2=736 symbols. Some possible design choices for (X/2, Y/2) can be (569, 167), (563, 173), and (557, 179), etc. In this example embodiment, the description is centered on (569, 167), but the design applies to any reasonable allocation of the 736 symbols into two parts.

The PSS is based on a length-569 ZC sequence with root 1, i.e., $$ZC_u[n]=\exp(-j\pi u(n(n+1)/N_{zc})), n=0, \ldots, N_{zc}-1$$

where $N_{zc}$=569 is the length of the ZC sequence, and u=1 is the root index of the ZC sequence. To cope with the initial unknown carrier frequency offset (CFO), the ZC sequence is differentially encoded at step 610 to yield sequence A. With 2× up sampling (step 660), the PSS sequence is obtained from the differentially encoded ZC sequence as follows.

$$PSS=ZC_1[0]0(ZC_1[0]ZC_1[1])0(ZC_1[0]ZC_1[1]ZC_2[2])0 \ldots (ZC_1[0]ZC_1[1]ZC_2[2] \ldots ZC_1[568])0$$

At step 620, the method determines the base sequence for the SSS. The SSS is based on length-167 ZC sequences with roots u=1, ..., 166. Each cell is associated with a SSS with a particular root, corresponding to the cell ID. Each cell applies different cyclic shifts to its associated base SSS sequences in different slots in order to yield sequence B. In particular, the cell associated with the root-u SSS in slot i, i=1, ..., 10, applies a cyclic shift m=(i−1)*16 to the its base sequence. With 2× up sampling (step 660), the SSS sequence is obtained from the ZC sequences as follows.

$$SSS=ZC_u[(0-m)_{167}]0ZC_u[(1-m)_{167}]0 \ldots ZC_u[(166-m)_{167}]0, u=1, \ldots, 166$$

where $x[(n-m)_N]$ denotes the sequence cyclically shifted by m elements from the length-N sequence x[n].

At step 640, sequence A (e.g., the PSS sequence) and sequence B (e.g., the SSS sequence) are concatenated in order to yield the new sequence C at step 650. That is C=AB. At step 660, the 2× up sampling is performed to yield the PSCH for transmission to wireless devices 110 in step 670. The PSCH comprises the PSS and the SSS.

Figure 7:
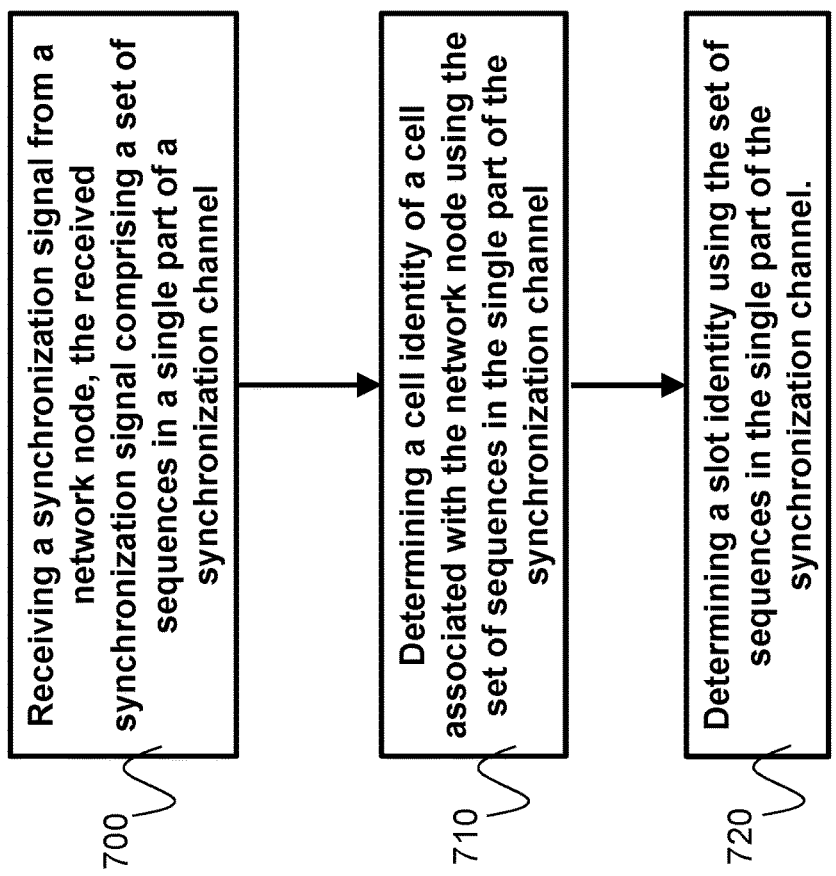
FIG. 7 is flow diagram of a method in a wireless device for receiving a synchronization signal, in accordance with certain embodiments.

FIG. 7 is flow diagram of a method in a wireless device 110 for receiving a synchronization signal, in accordance with certain embodiments. At step 700, the method receives a synchronization signal from a network node 115. The received synchronization signal comprises a set of sequences in a single part of a synchronization channel. In certain embodiments, the method receives a synchronization signal described above as being transmitted by a network node 115 (e.g., the signal transmitted in step 410 of FIG. 4, step 560 of FIG. 5, or step 670 of FIG. 6). At step 710, the method uses the set of sequences in the single part of the synchronization channel to determine a cell identity of a cell associated with the network node 115, and at step 720, the method use the set of sequences in the single part of the synchronization channel to determine a slot identity. An example of using the set of sequences to determine the cell identity and the slot identity is further described with respect to FIG. 8.

Figure 8:
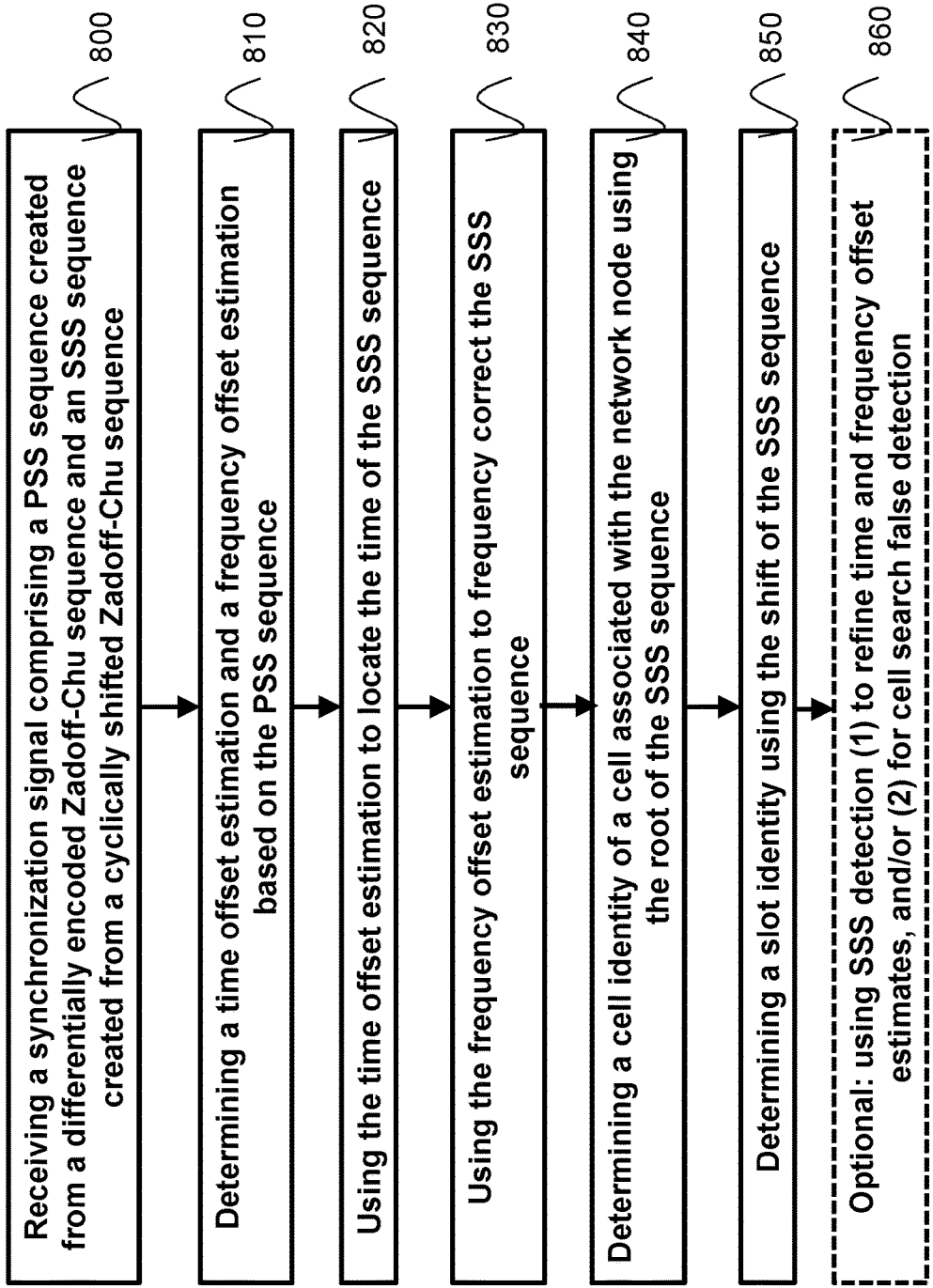
FIG. 8 is flow diagram of a method in a wireless device for receiving a synchronization signal, in accordance with certain embodiments.

FIG. 8 is flow diagram of a method in a wireless device 110 for receiving a synchronization signal, in accordance with certain embodiments. At step 800, the method receives a synchronization signal from a network node 115. The synchronization signal comprises a PSS sequence created from a differentially encoded ZC sequence and an SSS sequence created from a cyclically shifted ZC sequence. The root and a shift of the SSS sequence are configured to allow the wireless device 110 to determine a cell identity and a slot identity in order to synchronize with the network. Although the example describes the use of ZC sequences, other embodiments may use an m-sequence, Gold sequence, or other sequence with good autocorrelation properties.

At step 810, the method determines a time offset estimation and a frequency offset estimation based on the PSS sequence. At step 820, the method uses the time offset estimation to locate the time of the SSS sequence. At step 830, the method uses the frequency offset estimation to frequency correct the SSS sequence. At step 840, the method determines a cell identity of a cell associated with the network node 115 using the root of the SSS sequence. At step 850, the method determines the slot identity using the shift of the SSS sequence. Note that in an alternative embodiment, the root may be configured to convey the slot identity and the shift may be configured to convey the cell identity. At option step 860, the method uses the SS detection to refine the time offset estimate, to refine the frequency offset estimation, and/or for cell search false detection. In some embodiments, false detection is determined to have occurred if the highest correlation peak obtained from the SSS sequence is less than a threshold for successful cell detection.

Figure 9:
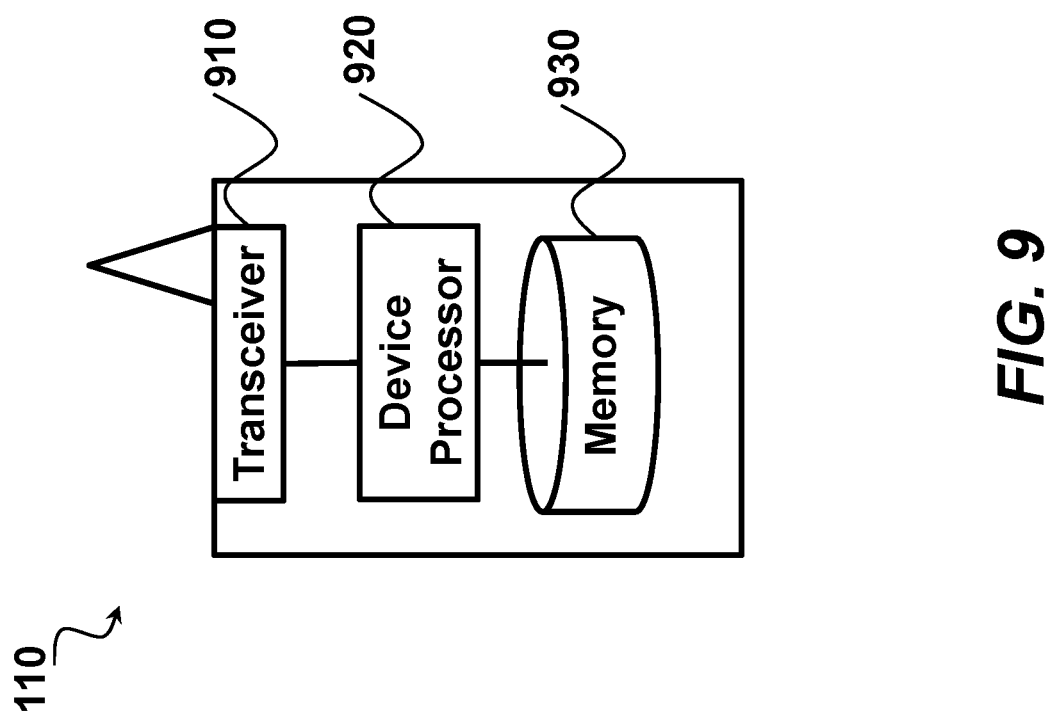
FIG. 9 is a block diagram of an exemplary wireless device, in accordance with certain embodiments.

FIG. 9 is a block diagram of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a low-cost and/or low-complexity UE, a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 910, processor 920, and memory 930. In some embodiments, transceiver 910 facilitates transmitting wireless signals to and receiving wireless signals from network node 115 (e.g., via an antenna), processor 920 executes instructions to provide some or all of the functionality described above as being provided by wireless device 110, and memory 930 stores the instructions executed by processor 920.

Processor 920 may include any suitable combination of hardware and software implemented in one or more modules to execute instructions and manipulate data to perform some or all of the described functions of wireless device 110, such as the functions of wireless device 110 described above in relation to FIGS. 1-8. In some embodiments, processor 920 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, processor 920 may comprise one or more of the modules discussed below with respect to FIG. 11.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 920.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 920. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Wireless device 110 may operate under either normal coverage or enhanced coverage with respect to its serving cell. The enhanced coverage may be interchangeably referred to as extended coverage. Wireless device 110 may also operate in a plurality of coverage levels (e.g., normal coverage, enhanced coverage level 1, enhanced coverage level 2, enhanced coverage level 3 and so on).

Figure 10:
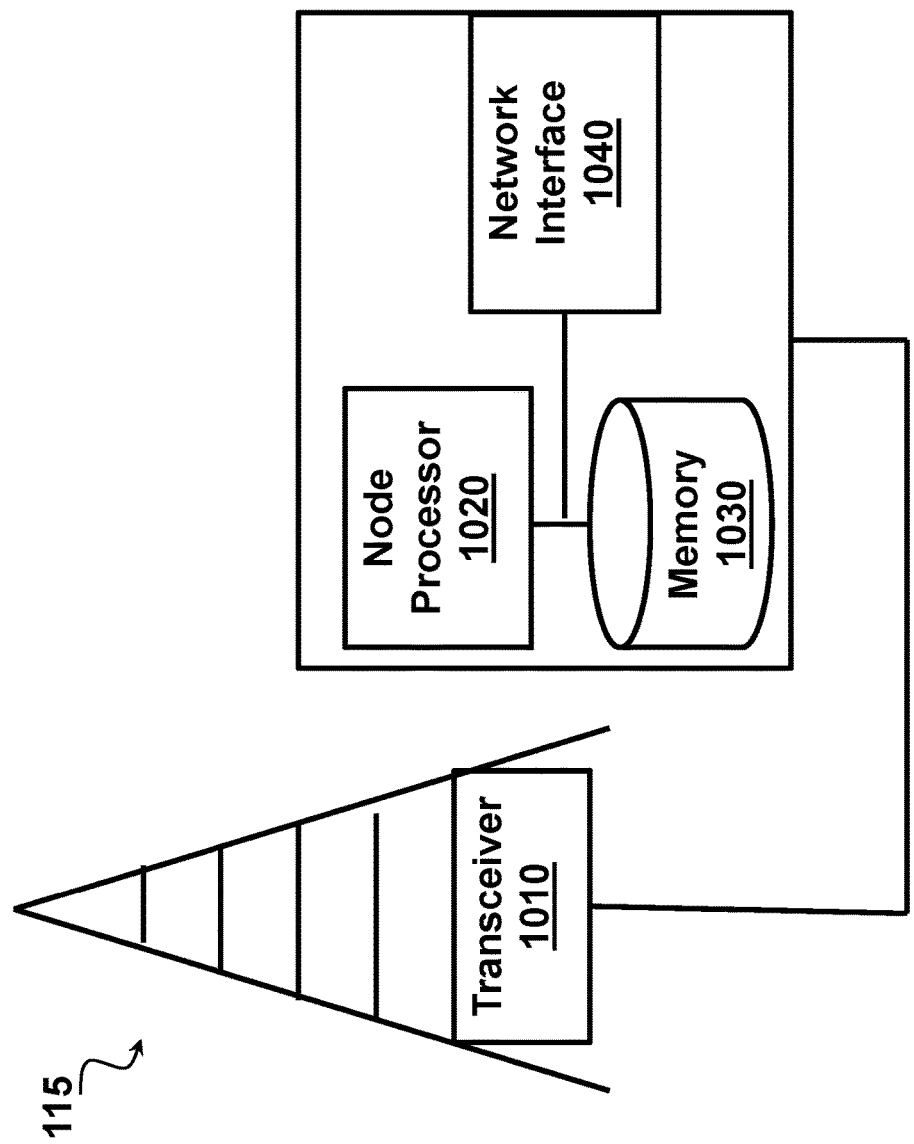
FIG. 10 is a block diagram of an exemplary network node, in accordance with certain embodiments.

FIG. 10 is a block diagram of an exemplary network node 115, in accordance with certain embodiments. Network node 115 may be any type of radio network node or any network node that communicates with a UE and/or with another network node.

Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1010, processor 1020, memory 1030, and network interface 1040. In some embodiments, transceiver 1010 facilitates transmitting wireless signals to and receiving wireless signals from wireless device 110 (e.g., via an antenna), processor 1020 executes instructions to provide some or all of the functionality described above as being provided by a network node 115, memory 1030 stores the instructions executed by processor 1020, and network interface 1040 communicates signals to backend network components, such as a gateway, switch, router, Internet, Public Switched Telephone Network (PSTN), core network nodes or radio network controllers, etc.

Processor 1020 may include any suitable combination of hardware and software implemented in one or more modules to execute instructions and manipulate data to perform some or all of the described functions of network node 115, such as those described above in relation to FIGS. 1-8 above. In some embodiments, processor 1020 may include, for example, one or more computers, one or more central processing units (CPUs), one or more microprocessors, one or more applications, and/or other logic. In certain embodiments, processor 1020 may comprise one or more of the modules discussed below with respect to FIG. 12.

Memory 1030 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 115, send output from network node 115, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

The terminology such as network node and UE should be considered non-limiting and does in particular not imply a certain hierarchical relation between the two. In some embodiments, UEs 110 may have device-to-device (D2D) capability. It may be possible for a first UE 110A in the D2D configuration to perform functionality described as being performed by a network node 115 and for a second UE 110B in the D2D configuration to perform functionality described as being performed by a wireless device 110.

Figure 11:
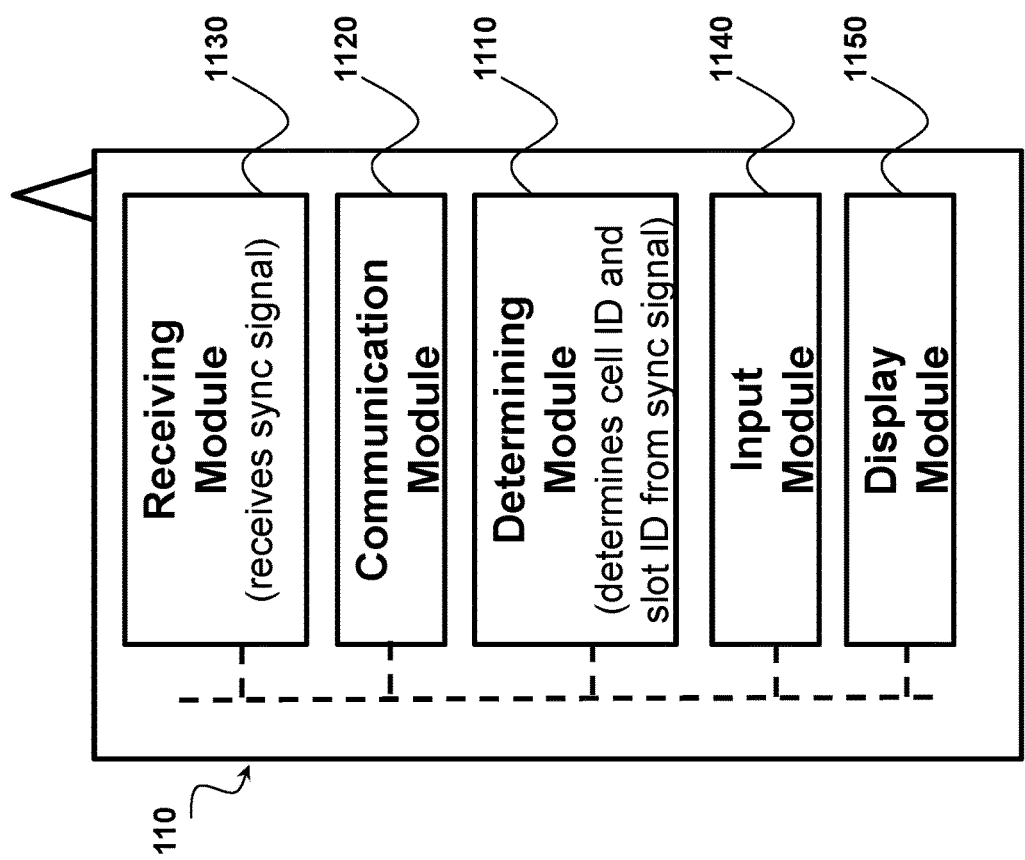
FIG. 11 is a block diagram of an exemplary wireless device, in accordance with certain embodiments.

FIG. 11 is a block diagram of an exemplary wireless device, in accordance with certain embodiments. Wireless device 110 may include one or more modules. For example, depending on the type of wireless device 110, wireless device 110 may optionally include one or more of: a determining module 1110, a communication module 1120, a receiving module 1130, an input module 1140, a display module 1150, and/or any other suitable modules.

Determining module 1110 may perform the processing functions of wireless device 110. For example, determining module 1010 may determine a cell identity associated with a network node 115 and a slot identity from a set of sequences received in a single part of a synchronization channel. Determining module 1110 may include or be included in one or more processors, such as processor 920 described above in relation to FIG. 9. Determining module 1110 may include analog and/or digital circuitry configured to perform any of the functions of determining module 1110 and/or processor 920 described above. The functions of determining module 1110 described above may, in certain embodiments, be performed in one or more distinct modules.

Communication module 1120 may perform the transmission functions of wireless device 110. Communication module 1120 may transmit messages to one or more of network nodes 115 of network 100. Communication module 1120 may include a transmitter and/or a transceiver, such as transceiver 910 described above in relation to FIG. 9. Communication module 1120 may include circuitry configured to wirelessly transmit messages and/or signals. In particular embodiments, communication module 1120 may receive messages and/or signals for transmission from determining module 1110.

Receiving module 1130 may perform the receiving functions of wireless device 110. For example, receiving module 1130 may receive a synchronization signal from a network node 115, the received synchronization signal comprising a set of sequences in a single part of a synchronization channel. Receiving module 1130 may include a receiver and/or a transceiver. Receiving module 1130 may include circuitry configured to wirelessly receive messages and/or signals. In particular embodiments, receiving module 1130 may communicate received messages and/or signals to determining module 1110.

Input module 1140 may receive user input intended for wireless device 110. For example, the input module 1140 may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1110.

Display module 1150 may present signals on a display of wireless device 110. Display module 1150 may include the display and/or any appropriate circuitry and hardware configured to present signals on the display. Display module 1150 may receive signals to present on the display from determining module 1110.

Determining module 1110, communication module 1120, receiving module 1130, input module 1140, and display module 1150 may include any suitable configuration of hardware and/or software. Wireless device 110 may include additional modules beyond those shown in FIG. 11 that may be responsible for providing any suitable functionality, including any of the functionality described above and/or any additional functionality (including any functionality necessary to support the various solutions described herein).

Figure 12:
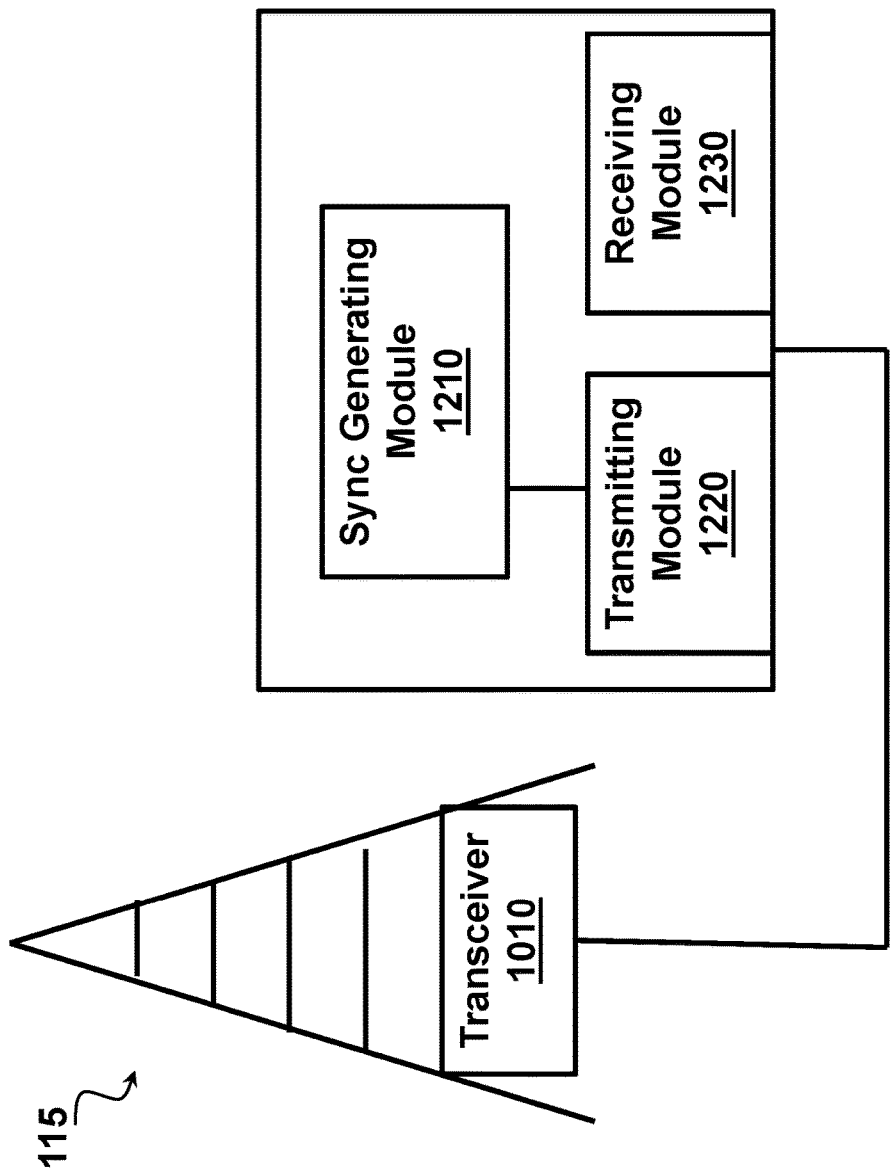
FIG. 12 is a block diagram of an exemplary network node, in accordance with certain embodiments.

FIG. 12 is a block diagram of an exemplary network node 115, in accordance with certain embodiments. Network node 115 may include one or more modules. For example, network node 115 may include sync generating module 1210, transmitting module 1220, receiving module 1230, and/or any other suitable modules. In some embodiments, one or more of sync generating module 1210, transmitting module 1220, receiving module 1230, and/or other suitable modules may be implemented using one or more processors, such as processor 1020 described above in relation to FIG. 10. In certain embodiments, the functions of two or more of the various modules may be combined into a single module.

Sync generating module 1210 may perform certain processing functions of network node 115. As one example, sync generating module 1210 may generate a synchronization signal using a set of sequences in a single part of a synchronization channel, wherein the set of sequences is configured to allow one or more wireless devices (110) to determine a cell identity and a slot identity during synchronization with the network node. Sync generating module 1210 may include or be included in one or more processors, such as processor 1020 described above in relation to FIG. 10. Sync generating module 1210 may include analog and/or digital circuitry configured to perform any of the functions of sync generating module 1210 and/or processor 1020 described above. The functions of sync determining module 1210 may, in certain embodiments, be performed in one or more distinct modules.

Transmitting module 1220 may perform the transmission functions of network node 115. As one example, transmitting module 1220 may transmit the generated synchronization signal comprising the synchronization sequence to the one or more wireless devices 110. Transmitting module 1220 may transmit messages to one or more of wireless devices 110. Transmitting module 1220 may include a transmitter and/or a transceiver, such as transceiver 1010 described above in relation to FIG. 10. Transmitting module 1220 may include circuitry configured to wirelessly transmit messages and/or signals. In particular embodiments, transmitting module 1220 may receive messages and/or signals for transmission from sync generating module 1210 or any other module.

Receiving module 1230 may perform the receiving functions of network node 115. Receiving module 1230 may receive any suitable information from a wireless device. Receiving module 1230 may include a receiver and/or a transceiver. Receiving module 1230 may include circuitry configured to wirelessly receive messages and/or signals. In particular embodiments, receiving module 1230 may communicate received messages and/or signals to a determining module or any other suitable module of network node 115.

Sync generating module 1210, transmitting module 1220, and receiving module 1230 may include any suitable configuration of hardware and/or software. Network node 115 may include additional modules beyond those shown in FIG. 12 that may be responsible for providing any suitable functionality, including any of the functionality described above and/or any additional functionality (including any functionality necessary to support the various solutions described herein).

Particular embodiments of the disclosure may have certain advantages. For example, a primary goal of the solution lies in mitigating some of the problems associated with the existing design for cell search mechanism in narrowband OFDMA systems. Compared to the existing design, the new design proposed in this disclosure achieves faster synchronization, lowers accumulation complexity at the devices and more accurate detection of slot ID and cell ID, which was not possible to achieve simultaneously in the existing design. Some embodiments include, but are not limited to the following.

In a first embodiment, cyclic shifts are applied to the Zadoff-Chu sequences in the SSS design for the detection of cell identity and slot identity.

In a second embodiment, an implicit hierarchical structure is designed in a single part of the synchronization channel to convey more than one type of information.

In a third embodiment, a set of sequences are used in a single part of the synchronization channel to transmit both the cell specific identify and slot identity information: the first property of a sequence determines the cell identify and the second property of the sequence determines the slot identity.

In a fourth embodiment, a set of Zadoff-Chu sequences are used in a single part of the synchronization channel to transmit both the cell specific identify and slot identity information: the root of a Zadoff-Chu sequence determines the cell identify and the cyclic shift of the sequence determines the slot identity, or the root of a Zadoff-Chu sequence determines the slot identify and the cyclic shift of the sequence determines the cell identity. An implicit hierarchical structure is designed in a single part of the synchronization channel to convey more than one type of information. This implicit hierarchical structure makes the design have good scalability as a network becomes dense. In particular, more sequences can be increasingly added to the candidate set to support denser network deployment without regrouping the sequences for transmitting two types of information.

In a fifth embodiment, a single signal, the primary synchronization signal, is periodically transmitted from the base station in each cell with shorter period, and is used by the device (terminal, user equipment) to obtain both time offset estimation, and frequency offset estimation. For example, the shorter period enables the device to complete cell search more quickly since the device can wait for shorter time to acquire the cell synchronization signal. Also, shorter period implies more energy or provide a higher processing gain per downlink frame (or unit time), leading to quicker cell search especially for devices in bad coverage. Finally, periodic transmission reduces accumulation complexity at the device.

In a sixth embodiment, the primary synchronization signal is created by differentially encoding a base sequence that has good auto-correlation properties, enabling time offset estimation in the presence of unknown frequency offset.

In a seventh embodiment, the time and frequency offset estimates are used to locate a SSS signal time, to frequency correct it, and to detect the cell identity and slot identity. The SSS signal is transmitted by the base station in each cell in each synchronization slot.

The embodiments may optionally be combined. As an example, the first embodiment may be combined with the third and/or fourth embodiments. As another example, the second embodiment may be combined with the fourth embodiment. As yet another example, the fifth embodiment may be combined with the sixth and/or seventh embodiments. Although certain examples have been described, the embodiments may combined in any other suitable manner.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method in a network node, comprising:
   generating a synchronization signal using at least a primary synchronization signal (PSS) sequence in a PSS part of a synchronization channel, wherein the synchronization channel comprises the PSS part and a secondary synchronization signal (SSS) part;
   transmitting the generated synchronization signal to one or more wireless devices using the PSS part of the synchronization channel;
   wherein the PSS sequence enables the one or more wireless devices to determine a time offset estimation for locating an SSS sequence and a frequency offset estimation for frequency correcting the SSS sequence; and
   wherein the SSS sequence enables the one or more wireless devices to determine the cell identity and the slot identity during synchronization with the network node.

2. The method of claim 1 wherein the set of sequences comprises a Zadoff-Chu sequence that enables the one or more wireless devices to determine the cell identity and the slot identity.

3. The method of claim 2, wherein:
   the Zadoff-Chu sequence comprises a root and a shift;
   the root enables the one or more wireless devices to determine the cell identity; and
   the shift enables the one or more wireless devices to determine the slot identity.

4. The method of claim 2, wherein:
   the Zadoff-Chu sequence comprises a root and a shift;
   the root enables the one or more wireless devices to determine the slot identity; and
   the shift enables the one or more wireless devices to determine the cell identity.

5. The method of claim 1, wherein the SSS sequence enables the one or more wireless devices to refine the time offset estimation and/or the frequency offset estimation determined from the PSS sequence.

6. The method of claim 1, wherein the SSS sequence enables the one or more wireless devices to determine whether a false detection has occurred based on whether a highest correlation peak obtained from the SSS sequence exceeds a threshold for successful cell detection.

7. The method of claim 1, wherein the PSS sequence comprises a differentially encoded Zadoff-Chu sequence and the SSS sequence comprises a cyclically shifted Zadoff-Chu sequence.

8. A method in a wireless device, comprising:
   receiving a synchronization signal from a network node, the received synchronization signal comprising at least a primary synchronization signal (PSS) sequence in a PSS part of a synchronization channel, wherein the synchronization channel comprises the PSS part and a secondary synchronization signal (SSS) part;
   determining, based on the PSS sequence, a time offset estimation for locating an SSS sequence, and a frequency offset estimation for frequency correcting the SSS sequence;
   determining, based on the SSS sequence, a cell identity of a cell associated with the network node; and
   determining, based on the SSS sequence, a slot identity.

9. The method of claim 8 wherein the set of sequences comprises a Zadoff-Chu sequence that enables the wireless device to determine the cell identity and the slot identity.

10. The method of claim 9, wherein:
    the Zadoff-Chu sequence comprises a root and a shift;
    the root enables the wireless device to determine the cell identity; and
    the shift enables the wireless device to determine the slot identity.

11. The method of claim 9, wherein:
    the Zadoff-Chu sequence comprises a root and a shift;
    the root enables the wireless device to determine the slot identity; and
    the shift enables the wireless device to determine the cell identity.

12. The method of claim 8, wherein the SSS sequence enables the wireless device to refine the time offset estimation and/or the frequency offset estimation determined from the PSS sequence.

13. The method of claim 8, wherein the SSS enables the wireless device to determine whether a false detection has occurred based on whether a highest correlation peak obtained from the SSS sequence exceeds a threshold for successful cell detection.

14. The method of claim 8, wherein the PSS sequence comprises a differentially encoded Zadoff-Chu sequence and the SSS sequence comprises a cyclically shifted Zadoff-Chu sequence.

15. A network node, comprising one or more processors configured to:
    generate a synchronization signal using at least a primary synchronization signal (PSS) sequence in a PSS part of a synchronization channel, wherein the synchronization channel comprises the PSS part and a secondary synchronization signal (SSS) part;
    transmit the generated synchronization signal to one or more wireless devices using the PSS part of the synchronization channel;
    wherein the PSS sequence enables the one or more wireless devices to determine a time offset estimation for locating an SSS sequence and a frequency offset estimation for frequency correcting the SSS sequence; and
    wherein the SSS sequence enables the one or more wireless devices to determine the cell identity and the slot identity during synchronization with the network node.

16. The network node of claim 15, wherein the set of sequences comprises a Zadoff-Chu having a root and a shift, the root enabling the one or more wireless devices to determine one of either the cell identity or the slot identity and the shift enabling the one or more wireless devices to determine the other of either the cell identity or the slot identity.

17. The network node of claim 15, wherein the SSS sequence enables the one or more wireless devices to:
   refine the time offset estimation determined from the PSS sequence;
   refine the frequency offset estimation determined from the PSS sequence; and/or
   determine whether a false detection has occurred based on whether a highest correlation peak obtained from the SSS sequence exceeds a threshold for successful cell detection.

18. The network node of claim 15, wherein the PSS sequence comprises a differentially encoded Zadoff-Chu sequence and the SSS sequence comprises a cyclically shifted Zadoff-Chu sequence.

19. The network node of claim 15, wherein the PSS sequence is transmitted according to a uniform periodicity, wherein the period is less than or equal to 10 ms.

20. A wireless device, comprising one or more processors configured to:
   receive a synchronization signal from a network node, the received synchronization signal comprising at least a primary synchronization signal (PSS) sequence in a PSS part of a synchronization channel, wherein the synchronization channel comprises the PSS part and a secondary synchronization signal (SSS) part;
   determine, based on the PSS sequence, a time offset estimation for locating an SSS sequence, and a frequency offset estimation for frequency correcting the SSS sequence;
   determine, based on the SSS sequence, a cell identity of a cell associated with the network node; and
   determine, based on the SSS sequence, a slot identity.

21. The wireless device of claim 20, wherein the set of sequences comprises a Zadoff-Chu having a root and a shift, the root enabling the wireless device to determine one of either the cell identity or the slot identity and the shift enabling the wireless device to determine the other of either the cell identity or the slot identity.

22. The wireless device of claim 20, the one or more processors further operable to use the SSS sequence to:
   refine the time offset estimation determined from the PSS sequence;
   refine the frequency offset estimation determined from the PSS sequence; and/or
   determine whether a false detection has occurred based on whether a highest correlation peak obtained from the SSS sequence exceeds a threshold for successful cell detection.

23. The wireless device of claim 20, wherein the PSS sequence comprises a differentially encoded Zadoff-Chu sequence and the SSS sequence comprises a cyclically shifted Zadoff-Chu sequence.

* * * * *